Jan. 27, 1925.
A. L. GIBBS
1,524,297
APPARATUS FOR REFRIGERATION
Filed March 21, 1921
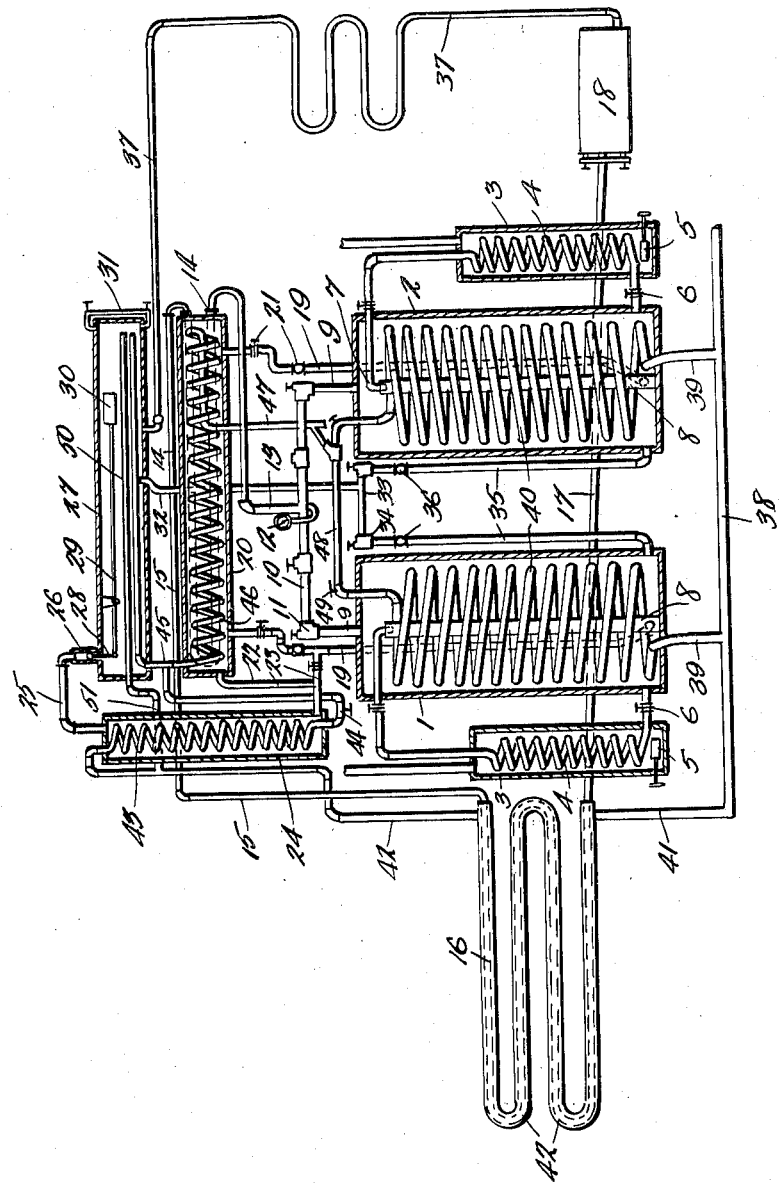
ALONZO L. GIBBS - INVENTOR.
WITNESSES
BY
ATTORNEY.

Patented Jan. 27, 1925.

1,524,297

UNITED STATES PATENT OFFICE.

ALONZO L. GIBBS, OF TULSA, OKLAHOMA.

APPARATUS FOR REFRIGERATION.

Application filed March 21, 1921. Serial No. 454,188.

*To all whom it may concern:*

Be it known that I, ALONZO L. GIBBS, a citizen of the United States, residing at Tulsa, in the county of Tulsa and State of Oklahoma, have invented certain new and useful Improvements in Apparatus for Refrigeration, of which the following is a specification.

This invention relates to new and useful improvements in the art of refrigeration and has for an object to provide a refrigerating system designed for all sizes of refrigerators and cold storage plants and to these ends comprises a minimum number of parts of inexpensive character permitting the economical construction and maintenance of the system.

Another principal object of the invention is to provide a refrigerating system embodying the absorption principles including means for cooling the weak liquor and inducing its absorption of the used ammonia gas, said means being separate and distinct from the means for anhydrating aqueous ammonia whereby the weak liquor is always maintained in a cool and proper state to effectively combine with the used ammonia gas.

Another principal object of the invention is to provide gas separator means and arrange the same directly in a still or generator for separating ammonia gas from aqueous ammonia and conveying the weak liquor or aqua away from the generating means without the use of pumps or other mechanical means, and through the cooling means for conditioning the weak liquor or for the most effective combination with used ammonia gas.

Another object of the invention is to provide a refrigerating system embodying the absorption principles and including a battery of two or more generators for generating anhydrous gas, with a condenser, rectifier, weak liquor receiver cooler, absorber, and other appurtenant parts of a refrigerating system in connection with and connected thereto whereby the anhydrous gas may be driven from the generator containing the rich liquor and subsequently absorbed in the absorber after expanding through the expansion coils and received in one of the generators.

Still another object of this invention is to provide a refrigerating system of the absorption type embodying generating means, a rectifier, a condenser, separator, weak liquor retainer, pre-cooler and expansion coils connected in a manner to permit three cycles to work in unison with each other, producing a continuous operation of the system and a cooling system extending through the various elements thereof, operative to progressively cool the elements during the flow of fluid from one end of the system to the other.

A further object of the invention is to provide a refrigerating system embodying a battery of two or more generators as above set forth, and means whereby either generate, or alternately or simultaneously be heated for the purpose above set forth.

Other objects and advantages of the invention will become apparent during the course of the following description.

The figure is a diagrammatic view illustrating the various elements of my improved refrigerating system and their association.

The various elements of the generating, condensing and expansion elements of the system will be considered first and subsequently the method of cooling the same. Therefore, with reference to the drawing, wherein the preferred embodiment of the invention is illustrated, the numerals 1 and 2 indicate a pair of generators in the form of tanks, which may be disposed vertically in small systems and horizontally in larger systems. A heater 3 is arranged adjacent each generator and includes a vertical coil 4 arranged above a heat producing medium 5. The coils 4 are made of such length that the aqueous ammonia passing therethrough will be heated to the proper degree to break the bonds of the same to release the anhydrous gas. The lower end of the coil is extended through the lower end of its respective generator and is provided with a valve 6 whereby the flow to the coil may be regulated at will. The upper end of the coil is extended vertically then horizontally to project through the upper end of its respective generator, the terminal of this end of the coil being directed downwardly and disposed centrally within the generator directly above a weak liquor tube 8. This tube extends vertically within its respective generator and has its lower end secured to the bottom of the generator tank so as to close the same.

Vertical pipe sections 9 are connected to the upper ends of the generator tanks 1 and 2 to communicate therewith. A horizontal pipe section 10 connects the pipe sections 9 and at their points of connection are provided with check valves 11. A pressure gauge 12 is connected to this horizontal pipe section 10 for indicating the amount of pressure in the system. A pipe 13 is connected to the pipe section 10 for conveying ammonia gas to a rectifier 14 which embodies the usual adjuncts of water jacketed coils.

A pipe 15 has one end connected to the outlet end of the rectifier and to the inlet end of a water jacketed condensing coil 16 wherein the ammonia gas is converted into anhydrate or liquid ammonia. A pipe line 17 is provided for conducting the liquid ammonia from the condenser 16 to a liquid ammonia receiver 18.

It will be recalled that the weak liquor from the heating coils was discharged into weak liquor tubes 8 within the generators and in order to convey the weak liquor to a point remote from the generators, a weak liquor pipe 19 is provided for each tube 8. The lower end of each weak liquor pipe 19 is connected at its lower end to the bottom of its respective tube 8, while the upper ends of the pipes 19 communicate with opposite ends of a pre-cooler 20. Each weak liquor pipe 19 is provided between its ends with a bend, at opposite ends of which are located check valves 21.

A pipe section 22 is connected to one end of the pre-cooler tank and joins a horizontal pipe section 23 which is unioned to one of the weak liquor pipes 19 at one end, and its other end communicates with the lower end of a main cooler tank 24.

A weak liquor pipe 25 has one end communicating with the upper end of the main cooler 24 while its opposite end is extended into a valve casing 26 arranged upon the top of an absorber tank 27. A valve 28 operates in the valve casing 26 and is controlled by a fulcrumed lever 29 within the absorber casing. A float 30 is provided for the fulcrumed lever 29 whereby the valve 28 will be automatically opened upon the weak liquor in the absorber tank 27 receding. A liquid level gauge 31 is associated with one end of the absorber tank for the determination of the liquid level therein.

The rich liquor pipe section 32 has its upper end extended through the bottom of the absorber tank to a point a substantial distance thereabove, while the lower end of this section is connected to a horizontal pipe section 33 having ammonia valves 34 at the ends thereof. Pipe sections 35 having corresponding upper ends associated with the valves 34, while their lower ends enter the lower ends of the two generator tanks 1 and 2. A check valve 36 is installed in each pipe section 35 for a purpose which will hereinafter appear.

A pipe 37 leads from the liquid ammonia receiver 18 through the expansion coils in the refrigerator, thence to the absorber tank 27 with which it communicates through the bottom thereof, and the return gas becomes absorbed in the weak liquor.

The elements of the refrigerating or expansion system proper having been described, the elements of the cooling system will next be considered. A main water supply pipe 38 is provided with branches 39 adapted to connect with the lower ends of water coils 40, one of which is disposed vertically in each generator tank. The outlet end 41 of the main water supply pipe connects with one end of the water jacket 42 surrounding the condenser coils and the water outlet for the same consists of a pipe line 42 for conveying water to a coil 43 disposed vertically in the main cooler 24. The lower end of this coil 43 is provided with a check valve 44 and is then extended vertically to terminate in a T-coupling 45. One arm of the T-coupling connects with one end of a horizontal water coil 46 disposed lengthwise of the pre-cooler tank 20. The outlet end of this horizontal coil extends back through the coil and then extends downwardly through the bottom of the pre-cooler casing and connects with a vertically disposed pipe line 47 leading to a suitable point of discharge such as a sewer.

The upper ends of the water coils 40 within the generators are extended through tops thereof to join a common discharge pipe 48 having check valves 49 at opposite ends thereof. Between the ends of this common discharge pipe 48, a branch is connected thereto and with the pipe line 47 whereby water from the coils may be discharged through the sewer.

Returning again to the T-coupling 45 disposed between the absorber tank and pre-cooler tank, it will be noted that the other arm of the coupling is connected to the discharge end of a horizontal coil 50 disposed within the absorber tank as clearly shown. The inlet end of this coil is furnished with cool water by a branch pipe 51 of the pipe line 42 leading from the condenser coil to the main cooler coil 43.

Having thus described the apparatus with which the invention is practiced, I will now trace through the various cycles thereof. It will of course be understood that aqueous ammonia may be injected into both generators which may be operated simultaneously, alternately, or one at a time. Assuming that both generators are adapted to operate alternately and the generator 2 is charged with aqueous ammonia, the charge will pass into the heating coil 4 associated with the generator 2. The heating coil is made of such length that when heat is applied and the rich liquor passes through the same arriving at the terminal 7 of the upper end of the coil, a large proportion of ammonia in the strong liquor has been converted into anhydrous gas and passes out through pipe 9, at the same time the weak liquor in the heating coil, is emptying into the weak liquor tube 8 and by the pressure in the generator tank is forced up through the pipes 19 into the pre-cooler tank where the week liquor is primarily cooled ready for the cooler 24.

From the pipe 9, the ammonia gas which is warm from the heater passes into the rectifier 14, where the steam that goes over with the anhydrous gas is condensed and drains back into the generator. The anhydrous gas passes out of the rectifier through the pipe line 15 into the condenser 16 where it is condensed into anhydrous and drains out through the pipe line 17 into the receiver 18. From here, it is expanded through the refrigerator and after performing its duty in the expansion coils which may be interposed in the pipe line 37, passes out as gas through the back pressure line 37 to the absorber tank 27.

As the weak liquor was traced to the pre-cooler 20, it will be taken up from here and carried to its destination. The weak liquor passes from the pre-cooler 20 through the pipe 22 into the bottom of the main cooler 24 wherein it is cooled to a greater degree by the water coil 43 extending through the cooler. From here, the weak liquor passes through the pipe 25 and is admitted into the absorber tank 27, provided of course the same is not full and the valve 28 therein is open. In this absorber tank, the weak liquor is cooled to a greater degree and is more susceptible to combination with the used ammonia gas entering through the back pressure line 37.

This used ammonia gas from the expansion coils combines with the weak liquor in the absorber to convert the weak liquor into a righ liquor at which time it is ready to return to the generator. As it was assumed that the generators operate alternately, one pair of valves 34 and 36 adjacent the generator 2 are closed and the corresponding pair adjacent the generator 1 are left open whereby the returning rich liquor may pass into the pipe section 35 of the generator 1 and gain admission thereto in order that this generator may be ready to operate immediately upon the generator 2 becoming exhausted of aqueous ammonia. It will therefore be obvious that first one generator will operate then the other and the operation will continue so long as is desired. It is also to be particularly noted that three direct cycles of operation are embodied in the present aparatus and that these cycles work in unison with each other, doing the same work which heretofore could only be accomplished with machinery of moving parts.

It is to be understood that both of the so called generator tanks 1 and 2 are charged with rich aqua ammonia, preferably in the proportion of 40% anhydrous ammonia and 60% water. The operation of the apparatus can perhaps be more clearly understood by dividing the operation into two steps, one treating with the course taken by the anhydrous gas and the other taken by the weak aqua ammonia or liquor. For the course taken by the anhydrous gas and in which a complete cycle occurs, we will start at the so called generator tank 2 wherein anhydrous gas is separated from the weak aqua ammonia by means of the heater 3 and weak liquor tube 8. The anhydrous gas passes up through pipe 9 and into the rectifier 14 from whence it passes into the condensing coil 16 to be condensed into a liquid from which it passes into the receiver 18 as anhydrous ammonia. From the receiver, the anhydrous ammonia liquid passes to the refrigerator coil and expands into a gas to pass to the absorber 27 wherein anhydrous gas meets with the weak liquor coming from the weak liquor cooler. After the anhydrous gas has been absorbed by the weak liquor to form a rich ammonia liquid, it drains back in the state in which it was first placed in the generator 2, to generator number 1, thereby completing a cycle.

The course taken by the weak ammonia liquor, to form what I term as the weak liquor cycle, is as follows: The rich aqua ammonia in the so called generator 2 passes through the heating coil 3 where the bonds are broken, the anhydrous ammonia gas taking its course as set out in the foregoing paragraph, leaving behind the weak liquor which drains into the weak liquor tube 8 and is forced by the pressure in the so called generator tank into the pre-cooler 20, cooler 24 and then into the absorber tank 27 where it unites with the anhydrous gas from the expansion coils and becomes rich liquor to drain back to the idle generator 1 which is being used as a storage while generator 2 is generating, thus bringing the rich aqua ammonia back to its original state and place.

Particular attention is called to the way in which the anhydrous gas is separated from the ammonia or rich liquor, and the location of the means for carrying out this function since by it, and the co-relation of other parts of the apparatus, it is possible to operate a refrigerating system by natural laws and without the use of pumps, compressors or other moving parts. Also due to the fact that the separation of gas and aqua occurs solely within the generators, conveying the weak liquor while at or above two hundred and twelve degrees Fahrenheit (while at that high temperature it will absorb a very small per cent of anhydrous) out of the weak liquor tube to the precooler; I am able to get a difference of about eighty per cent between the liquors, whereas in old systems the maximum difference of percentage of the liquors range around fifteen or twenty per cent. The automatic control valve associated with the absorber tank is also a great asset to the apparatus, inasmuch as the weak liquor is fed into the absorber tank until there is just a sufficient amount to absorb the ammonia gas coming from the expansion coils changing into a strong liquor ready to be conveyed to the generator which has been idle during the operation of the co-acting generator. The pipe which extends into the absorber tank has its upper end arranged adjacent the liquid level therein so that the richest of the liquor is permitted to drain back into the generator while the weaker solution is caused to remain in the tank until it has absorbed the proper quantity of ammonia gas. As soon as a sufficient amount of renewed or rich liquor passes from the absorber tank to take the liquor below the datum line the automatic valve operates to permit additional weak liquor or aqua ammonia to enter the absorber tank.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus described my invention what I claim as new and desire to secure by Letters Patent is:—

1. In a refrigerating apparatus, a plurality of generator tanks, means connected with each tank for heating the contents thereof and liberating the ammonia gas in the tanks, an absorber, weak liquor receiver means situated directly in each tank for receiving and maintaining weak liquor from the heating means separate from the charge of aqua ammonia in the tanks, a conduit including expansion coils and connecting the tanks to the absorber through which ammonia gas is conducted from the expansion coils to the latter, a weak liquor conduit connecting the weak liquor receiver means to the absorber through which weak liquor is forced into the absorber to combine with the ammonia gas from the expansion coils to form rich ammonia liquor, and valved conduit means connecting the absorber to the tanks through which rich ammonia liquor can be passed to one of said tanks while another is forcing weak liquor to the absorber.

2. In a refrigerating apparatus, a plurality of generator tanks, means connected with each tank for heating the contents thereof and liberating the ammonia gas in the tanks, an absorber means, means situated directly in each tank for receiving and maintaining weak liquor from the heating means separate from the charge of aqua ammonia in the tanks, a conduit including expansion coils and connecting the tanks to the absorber through which ammonia gas is conducted from the expansion coils to the latter, a weak liquor conduit connecting the weak liquor receiving means to the absorber through which weak liquor is forced to the absorber to combine with the ammonia gas from the expansion coils to form rich aqua ammonia liquor, a float controlled valve in said weak liquor conduit and a float in said absorber for actuating the valve, and valved conduit means connecting the absorber to the tanks through which rich ammonia liquor can be passed to one of said tanks while another is forcing weak liquor to the absorber.

3. In a refrigerating apparatus, a plurality of generator tanks, means connected with each tank for heating the contents thereof and liberating the ammonia gas in the tanks, an absorber, means situated directly in each tank for receiving and maintaining weak liquor from the heating means separate from the aqua ammonia in the tanks, a conduit including expansion coils and connecting the tanks to the absorber through which ammonia gas is conducted from the expansion coils to the latter, a weak liquor conduit connecting the weak liquor receiver means to the absorber through which weak liquor is forced by pressure in the tanks to the absorber to combine with the ammonia gas from expansion coils to form rich ammonia liquor, a float lever pivoted within the absorber and having a float on one end thereof, a valve carried by the other end of said float lever and arranged in said weak liquor conduit to regulate the flow of weak liquor into the absorber, and valved conduit means connecting the absorber to the tanks through which rich ammonia liquor can be passed to one tank while another is forcing weak liquor to the absorber.

4. A refrigerating apparatus comprising in combination a generator tank, cooling means for the weak liquor, an absorber tank having communication with said cooling means, a vertically disposed tube arranged in the generator tank and extending to a point spaced below the top of the tank, a weak liquor pipe connected to the lower end of the vertical tube for conducting the weak liquor to the cooling means, a heating coil connected to the generator and having a pipe leading therefrom into the generator tank and terminating directly above the upper end of the vertical tube therein where- 5. In a refrigerating apparatus, a plurality of generator tanks, means connected with each tank for heating the contents thereof and liberating the ammonia gas in the tanks, an absorber, a weak liquor receptacle situated directly in each tank for receiving and maintaining weak liquor from the heating means, separate from the charge of aqua ammonia in the tanks, a conduit including expansion coils and connecting the tanks to the absorber through which ammonia gas is conducted from the expansion coils to the latter, a weak liquor conduit connected to the absorber and to the bottoms of the weak liquor receptacles in the tanks through which weak liquor in the receptacle is forced to the absorber under pressure from the tanks to combine with the ammonia gas from the expansion coils to form rich ammonia liquor, and valved conduit means connecting the absorber to the tanks through which rich ammonia liquor can be passed to one tank while another is forcing weak liquor to the absorber.

6. A refrigerating apparatus comprising in combination a plurality of generator tanks, a pipe connected thereto for conveying off ammonia gas, primary and secondary cooling tanks for weak liquor, a pipe connecting each generating tank and primary cooling tank for conveying weak liquor to the latter, a by-pass connecting one of said pipes to the secondary cooling tank, a valve in said by-pass for controlling the passage therethrough, an outlet pipe for the weak liquor connecting the primary cooling tank and the by-pass, an absorber tank having connection with the secondary cooling tank, means for conducting used ammonia gas to the absorber tank, and means for conducting the resultant rich liquor from the absorber tank back to the generator tanks.

7. In a refrigerating apparatus, a plurality of generator tanks charged with aqua ammonia, means connected with each tank for heating the contents thereof and liberating the ammonia gas in the tanks, an absorber, a vertically disposed tube arranged in each tank and having its bottom closed and its top opening into the tank, a weak liquor conduit connected to the absorber and to the lower ends of the vertically disposed tubes, a conduit including expansion coils and connecting the tanks to the absorber through which ammonia gas is conducted from the expansion coils, and valved conduit means connecting the absorber to the tanks through which rich ammonia liquor can be passed to one tank while another is forcing weak liquor to the absorber 8. In a refrigerating apparatus, a plurality of generator tanks, means connected with each tank for heating the contents thereof and liberating the ammonia gas in the tanks, an absorber tank, means situated directly in each generator tank for receiving and maintaining weak liquor from the heating means separate from the charge of aqua ammonia in the generator tanks, a conduit including expansion coils and connecting the generator tanks to the bottom of the absorber tank for conducting ammonia gas to the latter, a weak liquor conduit connecting the weak liquor receiver means to the top of the absorber tank through which weak liquor is forced to the absorber to combine with the ammonia gas to form rich ammonia liquor, and valved conduit means connecting the absorber to the generator tanks through which rich ammonia liquor can be passed to one generator tank while another is forcing weak liquor to the absorber tank.

9. In a refrigerating apparatus, a plurality of generator tanks charged with aqua ammonia, means connected to each tank for heating the contents thereof and liberating the ammonia gas in the tanks one at a time, an absorber, means situated directly in each tank for receiving and maintaining weak liquor from the heating means separate from the charge of aqua ammonia in the tanks, a conduit including a rectifier, condenser coil, a receiver and an expansion coil connecting the tanks to the absorber through which ammonia is passed through the rectifier, condensed in the condenser coil and passed as liquid ammonia to be evaporated in the expansion coil and passed as ammonia gas from the expansion coil to the absorber, a weak liquor conduit connecting the weak liquor receiver means to the absorber through which weak liquor is forced into the absorber to combine with the ammonia gas from the expansion coil to form rich ammonia liquor, and valved conduit means connecting the absorber to the tanks, through which rich ammonia liquor can be passed to one of said tanks while another is forcing weak liquor to the absorber.

10. In a refrigerating apparatus, a plurality of generator tanks containing aqua ammonia, an absorber tank common to all generator tanks, a vertically disposed weak liquor tube in each generator tank having its top open and its bottom closed, a conduit connected to the lower end of each tube and to the absorber tank, and means for heating the aqueous ammonia in each generator tank and including a conduit leading to each generator tank and having its discharge end disposed to discharge weak liquor into its respective tube, and anhydrous gas into its respective generator tank.

11. In a refrigerating apparatus, a plurality of generator tanks adapted to contain aqueous ammonia, an absorber situated with respect thereto so as to drain by gravity to the generator tanks, a separate rich liquor inlet pipe for each generator tank and having a valve to regulate the flow of liquor therethrough, a conduit connected to said pipes and to the absorber whereby weak liquor can be conducted to either of the generator tanks, a weak liquor receptacle situated in each generator tank and having its upper open end communicating with the generator tank above the liquid level therein, a conduit communicating with each weak liquor receptacle and the absorber, and a heating conduit associated with each generator tank and having one end communicating with its respective generator tank and its opposite end extended into said generator tank and terminating directly above the weak liquor receptacle therein so as to discharge weak liquor thereinto and ammonia gas into the generator tank.

12. In a refrigerating apparatus, a plurality of generator tanks adapted to operate one at a time and alternately a valved ammonia gas pipe extending from the top of each generator tank, an absorber, a separate valved pipe for each generator tank in communication therewith, a conduit connected to said pipes and to the absorber, the absorber being arranged to cause rich liquor therefrom to gravitate back to either generator tank, a weak liquor receiving receptacle arranged in each generator tank and having its upper end open and disposed above the liquid level therein, and a heating conduit for each generator tank having one end communicating with the bottom of its respective tank and its other end extended into its respective tank and terminating directly above the open upper end of the weak liquor receiver.

13. A refrigerating device comprising a generator tank, means for heating the contents thereof and liberating ammonia gas in said tank, weak liquor receiver means situated in said tank for receiving weak liquor from the heating means and retaining it separate from the aqua ammonia in said generator tank, and means for discharging weak liquor from the weak liquor receiver means by pressure of the ammonia gas.

14. A refrigerating device comprising a generator tank, means for heating the contents thereof and liberating ammonia gas in said tank, a vertical weak liquor tube situated in said tank for receiving weak liquor from the heating means and retaining it separate from the aqua ammonia in said generator tank, and means for discharging weak liquor from the bottom of said tube by pressure of the ammonia gas in said tank.

15. In a refrigerating system, a pair of tanks charged with aqua ammonia, means connected to the tanks for alternately heating the contents thereof for separating the weak liquor from the ammonia gas, an absorber, a conduit for conveying weak liquor from the tanks to the absorber, and a conduit for conveying rich liquor from the absorber to either tank.

In testimony whereof I affix my signature in presence of two witnesses.

ALONZO L. GIBBS.

Witnesses:
M. HARVEY,
S. N. CRIDER.